United States Patent [19]

McCrory et al.

[11] Patent Number: 4,566,214

[45] Date of Patent: Jan. 28, 1986

[54] FEEDING WILDFOWL DECOY

[76] Inventors: Michael L. McCrory, 279 Southwick, Southaven, Miss. 38671; Roy E. McCrory, 4044 Bishops Bridge Rd., Memphis, Tenn. 38118

[21] Appl. No.: 583,649

[22] Filed: Feb. 27, 1984

[51] Int. Cl.⁴ .......................................... A01M 31/06
[52] U.S. Cl. .......................................... 43/3; 446/158
[58] Field of Search ........................ 43/2, 3; 446/158

[56] References Cited

U.S. PATENT DOCUMENTS

| | | | |
|---|---|---|---|
| 2,439,710 | 4/1948 | Banigan | 43/3 |
| 2,443,040 | 6/1948 | Jones | 43/3 |
| 2,799,960 | 7/1951 | Riley | 43/3 |
| 2,835,064 | 5/1958 | Webb | 43/3 |
| 3,115,721 | 12/1963 | Story | 43/3 |
| 3,841,012 | 10/1974 | Maled | 43/26.2 |
| 4,128,958 | 12/1978 | Snow | 43/3 |
| 4,322,908 | 4/1982 | McCrory | 43/3 |
| 4,422,257 | 12/1983 | McCrory | 43/3 |

Primary Examiner—Nicholas P. Godici
Assistant Examiner—C. McKee

[57] ABSTRACT

An improved wildfowl decoy featuring electromechanical means for lifelike motion when operated upon water. Anchored the same as regular wildfowl decoy it, while operating, moves continuously and produces a continuous outflow of ripples upon the water surrounding it. It is uncomplicated, durable long running, and cost is low.

9 Claims, 6 Drawing Figures

FIG. 1.
FIG. 2.
FIG. 3.
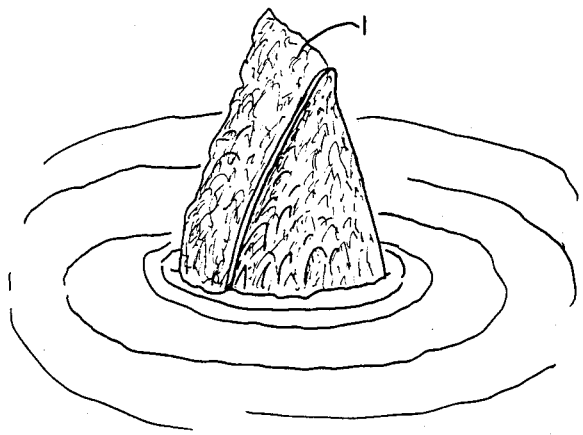
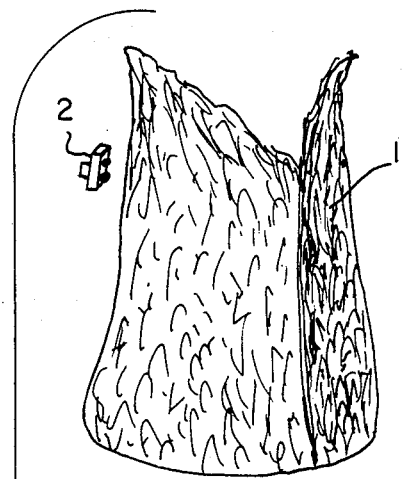
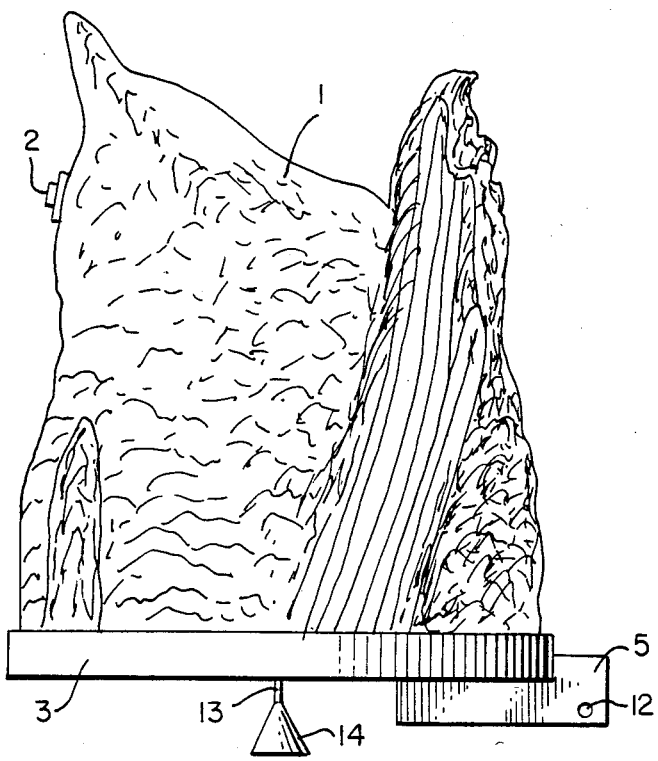
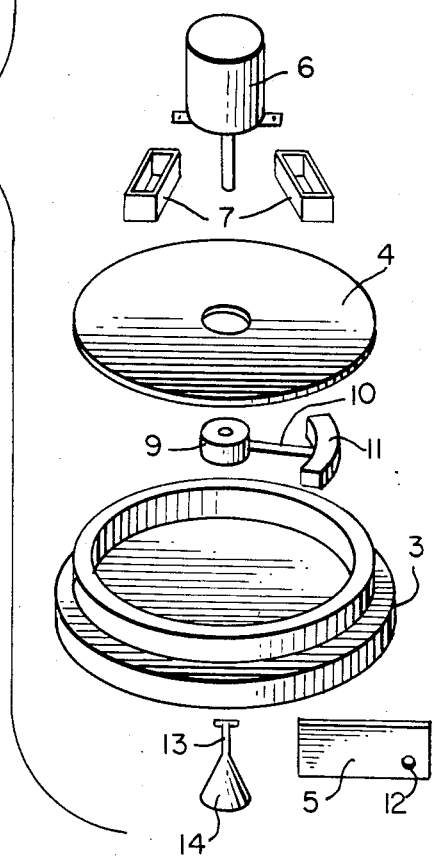

FEEDING WILDFOWL DECOY

BRIEF SUMMARY

This invention provides an improved electromechanical wildfowl decoy with self-contained power which, when operated upon water, converts such power into distinctive and energetic motion of the decoy to convey impressions to wildfowl in the vicinity that it is alive and active.

Another object of this invention is to provide an electromechanical wildfowl decoy as described herein which will operate reliably for sustained periods and which can be produced and operated at low cost.

Other objects reside in the adaptability of its rotatable eccentric center of gravity to other purposes.

The electromechanical wildfowl decoy described herein comprises structure and functions to attain these objectives.

BRIEF DESCRIPTION OF THE DRAWINGS

FIG. 1 is a drawing of the preferred embodiment of an electromechanical wildfowl decoy, embodying features of the present invention, in water and operating, with ripples upon the water emanating therefrom.

FIG. 2 is an elevational view of an electromechanical wildfowl decoy, embodying features of the present invention, in its operative position and illustrating presence and relationship of various parts.

FIG. 3 is a partially exploded, partially perspective, elevational view of an electromechanical wildfowl decoy, embodying features of the present invention, illustrating the presence and relationship, and order of assembly, of the various parts.

DESCRIPTION OF THE PREFERRED EMBODIMENT

Figure 4:
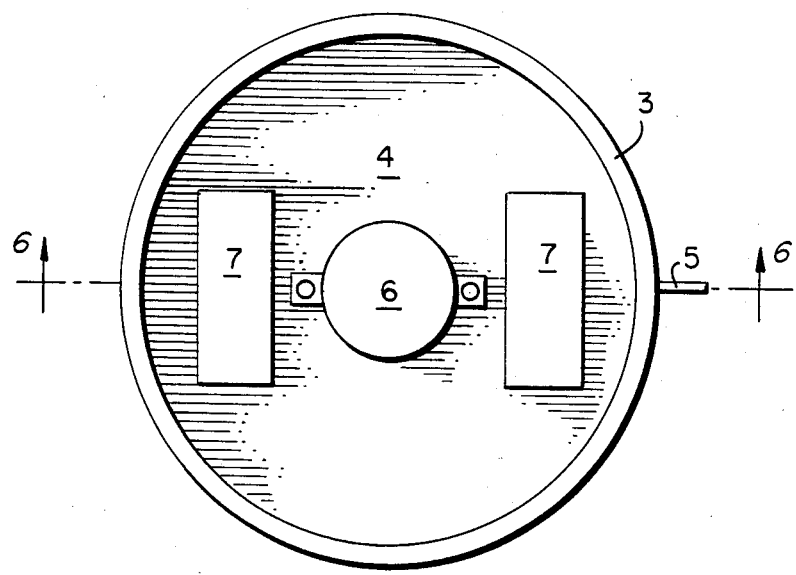
FIG. 4 is a top plan view of a flotation barge with deck, motor, and battery holders, for an electromechanical wildfowl decoy, embodying features of the present invention, illustrating the presence and relationship of various parts.

Illustrated by way of example only in FIGS. 1, 2, 3, 4, 5, and 6 is a preferred embodiment of the instant invention where it will be seen that the electromechanical wildfowl decoy therein is an invention comprising complete and effective structure and functions which are full, clear, concise and exact as to enable any person skilled in the art to make and use it. It will be seen that no attempt has been made herein to provide complete structural details by means of which the elements, including sub-assemblies, either in whole or in part, for attachment, replacement, or adjustment of a part or of the elements, can be assembled or disassembled, since such expedients are common and well known and have no bearing on the invention as herein presented. It will further be seen that wildfowl appearance means hollow body 1 comprises the rear part of a wildfowl hollow body decoy formed of lightweight plastic, or other material, in the image of a duck, goose, or other wildfowl, and is detachably affixed upon flotation barge 3. Means for flotation comprises flotation barge 3, with cavity in bottom thereof, formed of lightweight solid mass low density plastic, or other, flotation material, or other flotation device. Means to attenuate decoy rotation during operation comprises fin 5, of any desired design, made from thin lightweight plastic, or other material, fixedly attached to bottom of flotation barge 3 with hole 12, or other well known expedient, for affixing anchor line. Suspension bar 13 means, comprised of a rigid steel, aluminum, plastic, or other rod or bar of suitable length, diameter, or design, is rigidly affixed and vertically disposed downward from flotation barge 3, from bottom center, as a bail type affixed at opposite sides, or other design, and includes means for attachment thereto of counterbalance 14 means. Counterbalance 14 means comprises a weight made from any well known expedient such as steel, iron, plastic, or other material of a suitable size and weight and is attached to bottom of suspension bar 13 to provide a lowered vertical center of gravity of the decoy to oppose tip-over. Deck 4 means comprises a thin piece of flat, lightweight plastic, or other suitable material, detachably affixed upon flotation barge 3, and provides mount means for battery holders 7 and motor 6. Battery holders 7 are fixedly attached upon deck 4 means to hold batteries 8 and comprise any well known expedient of present day technology.

Battery 8 means comprises batteries as are presently commercially available, either re-chargeable or non-rechargeable, and provide power for motor 6. Electric motor 6 comprises any suitable present day commercially available equipment and is vertically attached upon deck 4 with shaft downward through deck 4 center into flotation barge 3 cavity. Switch 2 means comprises a commercially available electric switch suitable to energize, or de-energize, electric circuit FIG. 5, and is exteriorly disposed upon hollow body 1. Electric circuit means, FIG. 5, comprises interconnection, by appropriate wiring, of electrical elements within the circuit. Connector collar 9 means comprises any well known expedient for connecting two rods perpendicular to each other and is adjustably attached to shaft of motor 6, they being disposed within cavity of flotation barge 3. Connector rod 10 comprises a rigid steel, aluminum, plastic, or other rod of suitable length and diameter with one end adjustably attached to collar means 9 such that connector rod 10 is horizontally disposed within, and toward circumference of, flotation barge 3 cavity. Weight means 11 comprises an appropriate piece of steel, iron, lead, plastic, or other well known expedient adjustably attached to connector rod 10 within, and near the circumference of, flotation barge 3 cavity.

OPERATION OF THE PREFERRED EMBODIMENT

Figure 5:
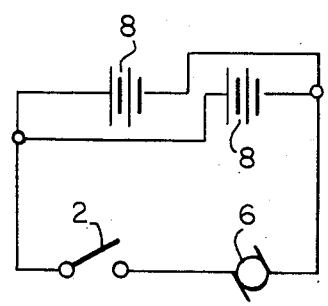
FIG. 5 is a partial schematic and partial diagrammatical view of an electric circuit for an electromechanical wildfowl decoy embodying features of the present invention.
Figure 6:
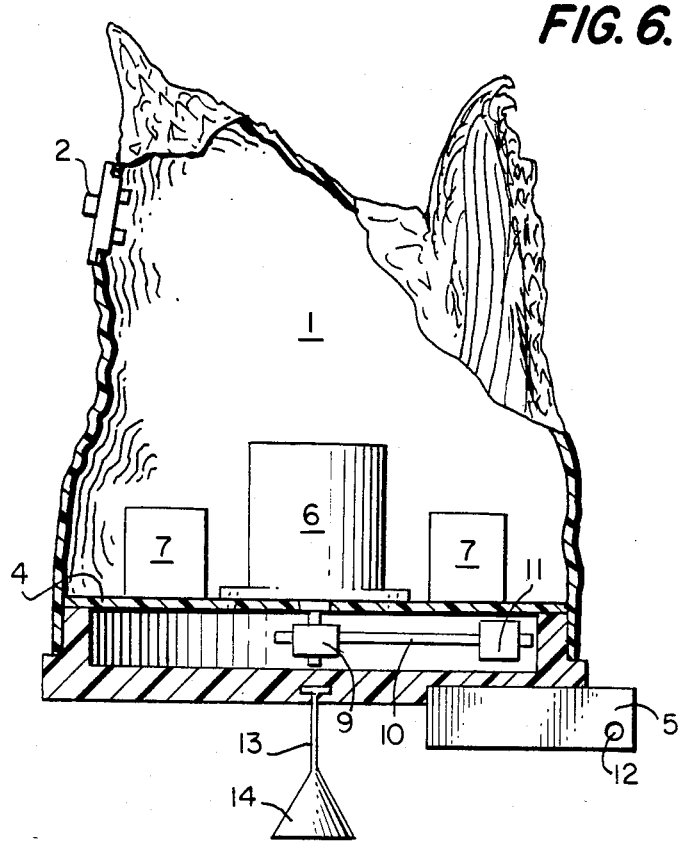
FIG. 6 is a vertical longitudinal sectional through an electromechanical wildfowl decoy, embodying features of the present invention, and illustrating the presence and relationship of various parts.
Figure 7:
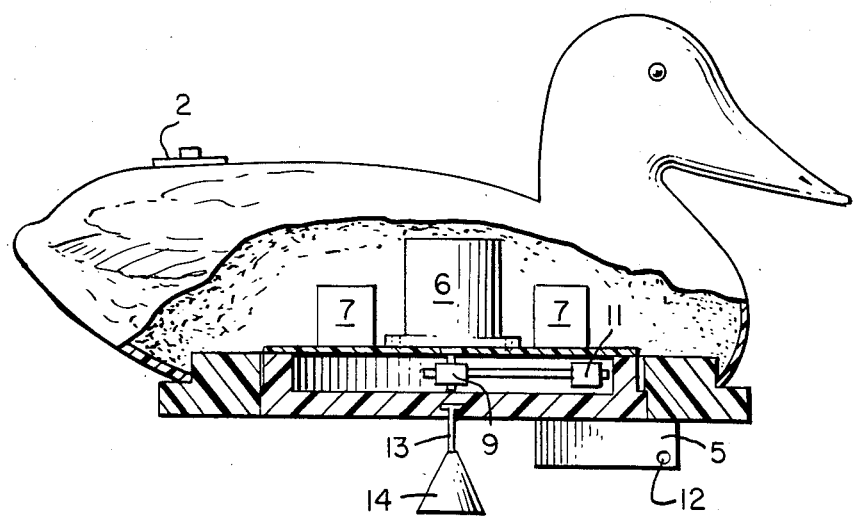

Operation comprises moving switch 2 to on position to employ electric circuit FIG. 5 to apply current from battery 8 to operate motor 6 whose shaft then rotates weight 11. The disposition of weight 11 being inside, and near the circumference of, flotation barge 3 cavity establishes horizontal center of gravity of the decoy at a point between decoy center and weight 11. Therefore, as motor shaft 6 rotates weight 11 concentrically of decoy center the horizontal center of gravity, which exists between decoy center and weight 11, eccentric of decoy center, rotates to become a rotating eccentric center of gravity, the effect of which is converted into motion of the decoy as, in response, circumferential flotation draft of flotation barge 3 rises and falls in the water. Inclination of the decoy to rotate in the water in response to the inertial force of rotating weight 11, and otherwise exhibit instability, is opposed by resistance of the water to lateral movement of fin 5. Inclination of the decoy to tip over is opposed by the low vertical center of gravity imposed by presence of counterbalance 14.

It will be appreciated that in some instances certain of the sub-assemblies or mechanisms herein described could be omitted and the invention could operate with only a part of the previously described structure and functions incorporated therein.

From the foregoing it will be apparent to those skilled in the art that a useful and improved electromechanical wildfowl decoy is provided by the present invention and that the objects of the invention are fulfilled. It will be further apparent that while a preferred embodiment of the invention has been shown and described, changes can be made without departing from the principals and spirit of the invention, the scope of which is defined in the following claims. For example, the hollow body wildfowl decoy image, shown in the preferred embodiment drawings as the rear portion of a wildfowl decoy body, that portion being vertically disposed such that, upon water, it appears to be a live wildfowl feeding with its head beneath the water, could instead be a full bodied wildfowl decoy horizontally disposed where, upon water, it would appear to be a live wildfowl floating and moving in a horizontal position. Another example would be that the rotatable horizontal eccentric center of gravity could instead be mounted to develop a vertical rotatable eccentric center of gravity and produce similar results. Accordingly, the preferred embodiment shown and described is to be considered illustrative, rather than restrictive, of the invention, and those modifications which come within the meaning and range of equivalency of the claims are to be included therein.

Accordingly, we claim:

1. An electromechanical wildfowl decoy comprising a floatable hollow body being formed in the image of a wildfowl and housing therein means for establishing an eccentric rotatable center of gravity, for the purpose of imparting life-like motion to said decoy, said means for establishing an eccentric rotatable center of gravity comprising an electric motor and shaft located at substantially the horizontal center of said hollow body, weight means and coupling means for coupling said weight means to said shaft for eccentric rotational motion about said horizontal center.

2. The electromechanical wildfowl decoy of claim 1 wherein the floatable hollow body comprises the rear portion of a wildfowl decoy body, that portion being vertically disposed such that, upon water, it appears to be a live wildfowl feeding with its head beneath the water.

3. The electromechanical wildfowl decoy of claim 1 wherein the floatable hollow body comprises a full bodied wildfowl decoy horizontally disposed where, upon water, it appears to be a live wildfowl floating and moving in a horizontal position.

4. The electromechanical wildfowl decoy of claim 1 wherein said electric motor is powered by batteries housed within said hollow body.

5. The electromechanical wildfowl decoy of claim 1 wherein the bottom of the hollow body is a flotation barge made from solid mass low density plastic flotation material.

6. The electromechanical wildfowl decoy of claim 5 wherein the bottom has vertically disposed fixedly attached fin means with means to attach anchor line.

7. The electromechanical wildfowl decoy of claim 1 further comprising electric circuit means including a manually operated on/off switch disposed exteriorly upon the hollow body.

8. The electromechanical wildfowl decoy of claim 1 wherein a counterbalance comprising a weight is attached to a suspension bar beneath the decoy to effectuate a lowered vertical center of gravity.

9. The electromechanical wildfowl decoy of claim 1 wherein said eccentric rotational motion is in a horizontal plane.

* * * * *